(12) United States Patent
Onu

(10) Patent No.: US 7,379,830 B2
(45) Date of Patent: May 27, 2008

(54) PERIOD DETERMINATION OF A PERIODIC NRZ SIGNAL

(75) Inventor: Dan Onu, Redmond, WA (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 11/137,176

(22) Filed: May 24, 2005

(65) Prior Publication Data

US 2005/0273285 A1    Dec. 8, 2005

Related U.S. Application Data

(60) Provisional application No. 60/574,524, filed on May 25, 2004.

(51) Int. Cl.
  *G01R 13/02* (2006.01)
  *G01R 13/20* (2006.01)
(52) U.S. Cl. .................. 702/67; 324/121 R
(58) Field of Classification Search ......... 702/66, 702/67, 57, 71, 73, 108, 127, 189; 324/121 R; 345/440.1
See application file for complete search history.

(56) References Cited

U.S. PATENT DOCUMENTS

| 5,012,494 A | 4/1991 | Lai |
| 6,266,172 B1* | 7/2001 | Zirngibl ............... 398/25 |
| 6,285,722 B1* | 9/2001 | Banwell et al. ......... 375/354 |
| 6,608,875 B1* | 8/2003 | Wolaver ............... 375/375 |

* cited by examiner

*Primary Examiner*—John Barlow
*Assistant Examiner*—Toan M. Le
(74) *Attorney, Agent, or Firm*—Thomas F. Lenihan

(57) ABSTRACT

A method and apparatus for determining the period $T_p$ of a signal representing a digitally modulated waveform using NRZ coding with a discrete/integer number of a clock periods between signal transitions, where a periodic sequence of logic "1s" and logic "0s" is transmitted. The method samples an input periodic signal, constructs an estimate of the autocorrelation sequence $r_k$ of the sequence of samples, constructs a sequence of peaks $p_k$, and computes the period $T_p$ to be the time between the first $p_k$ sample (k=0), and the time location of the maximum value of $p_k$ based on the known $T_s$ spacing of the $p_k$ sequence samples.

12 Claims, 5 Drawing Sheets

PERIOD DETERMINATION OF A PERIODIC NRZ SIGNAL

CLAIM FOR PRIORITY

The subject application claims priority from U.S. Provisional Patent Application Ser. No. 60/574,524, entitled PERIOD DETERMINATION OF A PERIODIC NRZ SIGNAL, (Dan Onu), filed 25 May 2004 and assigned to the same assignee as the subject application.

FIELD OF THE INVENTION

The subject invention generally concerns measurement of a characteristic of a signal acquired by a test and measurement instrument, and specifically concerns determination of the period of a periodic NRZ signal acquired by a test and measurement instrument, such as an oscilloscope, or the like.

BACKGROUND OF THE INVENTION

The Alliance for Telecommunication Industry Solutions (ATIS) defines "non-return-to-zero (NRZ)" to be a code in which logic "1s" are represented by one "significant condition" and logic "0s" are represented by another, with no neutral or rest condition, such as a zero amplitude in amplitude modulation (AM), zero phase shift in phase-shift-keying (PSK), or mid-frequency in frequency-shift-keying (FSK). The term "significant condition" is defined as follows. In the modulation of a carrier, "significant condition" is one of the values of the signal parameter chosen to represent information. Examples of "significant conditions" are an electrical current, voltage, or power level; an optical power level; a phase value; or a frequency or wavelength chosen to represent a "0" or a "1"; or a "mark" or a "space." The duration of a significant condition is the time interval between successive "significant instants".

Significant conditions are recognized by an appropriate device. Each "significant instant" is determined when the appropriate device assumes a condition or state usable for performing a specific function, such as recording, processing, or gating. A change from one significant condition to another is called a "signal transition".

For a given data signaling rate (i.e., bit rate) the NRZ code requires only one-half the bandwidth required by the well-known "Manchester Code". One skilled in the art will recognize that the Manchester Code is a code in which (a) data and clock signals are combined to form a single self-synchronizing data stream, (b) each encoded bit contains a transition at the midpoint of a bit period, (c) the direction of transition determines whether the bit is a "0" or a "1," and (d) the first half is the true bit value and the second half is the complement of the true bit value.

The process of varying one or more parameters of a carrier wave as a function of two or more finite and discrete states of a signal is known as digital modulation. It is the process by which some characteristic (frequency, phase, amplitude, or combinations thereof) of a carrier frequency is varied in accordance with a digital signal, for example, a digital signal consisting of coded pulses or states.

One particular class of digital modulation employing NRZ is the one for which the time between signal transitions is a multiple of the embedded clock period. There are many practical and theoretical approaches of this sort to transmitting information. In such implementations the information data is transmitted or retrieved without any additional timing reference. Examples include the high-frequency waveforms for optical storage (CD/DVD), serial data communications standards (Infiniband, PCI Express), and many others. In some of these cases the information is contained in the timing between signal transitions (as in optical storage CD/DVD signals), in some others the information is contained in the amplitude of the signal between the signal transitions, and so on.

The salient feature of digital modulation using NRZ with integer numbers of clock periods between signal transitions is that for each clock period there is exactly one logic "1" or logic "0" bit of information associated with each clock period time length of decoded signal. Therefore, a major step in decoding these types of digital modulation signals is the recovery of the embedded clock, or the determination of the period of the embedded clock. The complexity of this task is greatly reduced if the period of the NRZ signal is first known.

SUMMARY OF THE INVENTION

The subject invention is a method and an apparatus using that method for determining the period $T_p$ of a signal representing a digitally modulated waveform using NRZ coding with a discrete/integer number of a clock periods between signal transitions, where a periodic sequence of logic "1s" and logic "0s" is transmitted. The method comprises the steps of sampling an input periodic signal, constructing an estimate of the autocorrelation sequence $r_k$ of the sequence of samples, constructing the sequence $$p_k = \frac{r_k - r_{k/2}}{r_0 - r_{k/2}},$$

and computing the period $T_p$ to be the time between the first $p_k$ sample (k=0), and the location of the maximum value of $p_k$ based on the known $T_s$ spacing of the $p_k$ sequence samples.

DESCRIPTION OF THE EMBODIMENTS

The subject invention will be described with reference to FIGS. 1-4. This invention describes an approach to determining the period $T_p$ of a signal representing a digitally modulated waveform using NRZ coding with a discrete/integer number of a clock periods between signal transitions, where a periodic sequence of logic "1s" and logic "0s" is transmitted.

The specific steps of the subject invention are presented in the following. For clarity of the description, the signal x(t)

will be referred to using the usual discrete time notations, as a sequence, where $x_k=x(t_k)$, where $t_k=n*T_s$, $T_s$ being the sample interval of the signal x(t). However, the same procedure can be followed when processing the signal x(t) using an analogue approach, and the description would mainly change from references to "sequence" to references to "function".

Figure 4:
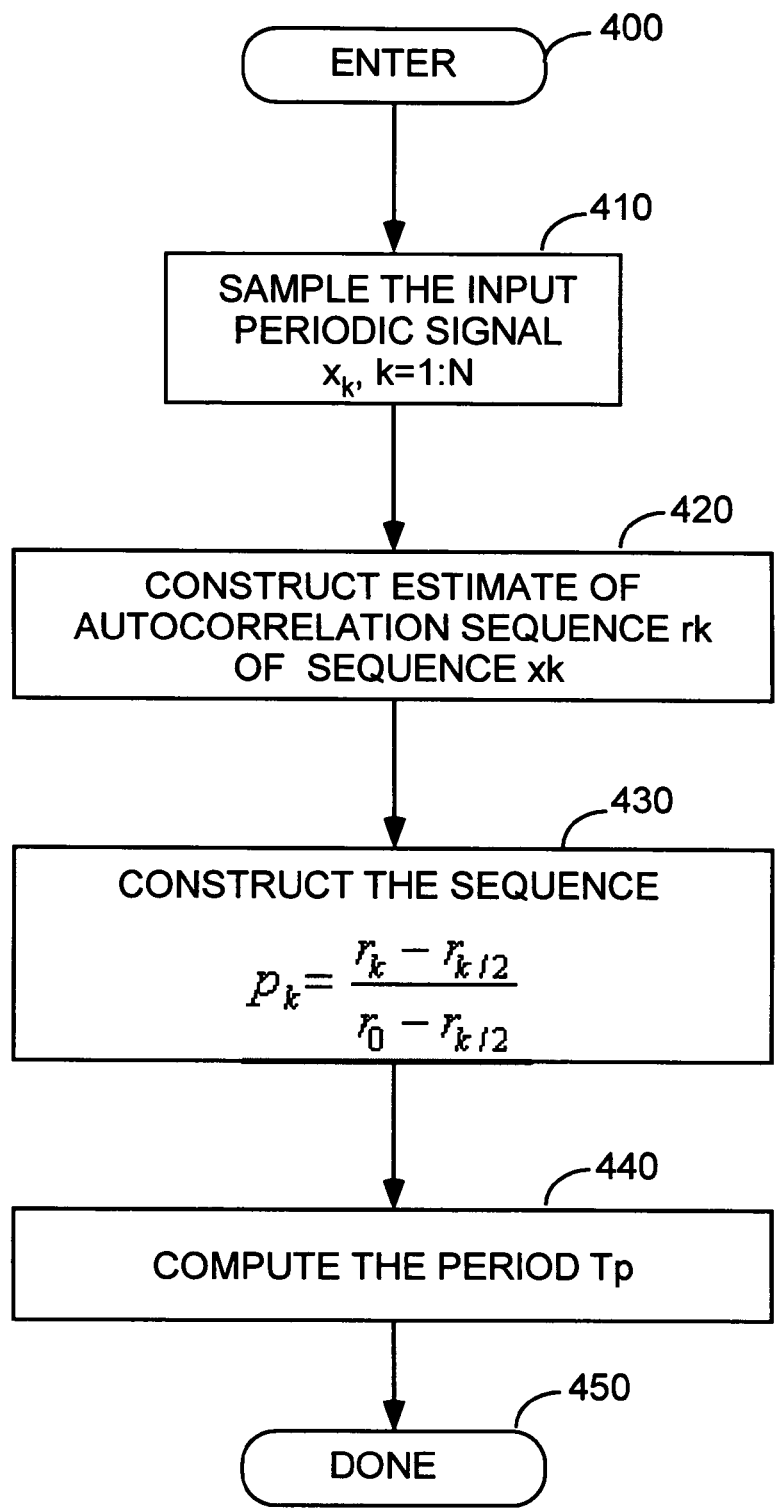
FIG. 4 is a flowchart useful for understanding the invention.

Referring to the flowchart of FIG. 4, a software routine for practicing the invention is entered at step 400 and advances to step 410 wherein an input signal is sampled, for example, by a digital oscilloscope, in a process known as signal acquisition. Let $x_k$, k=1 :N, be the samples of the signal. In step 420, the routine constructs an estimate of the autocorrelation sequence $r_k$ of the sequence $x_k$. There are several approaches that can be used for this step; the invention does not depend on the specific one used. Some possible approaches are listed below, but it is to be understood that the subject invention is not limited to these two implementations or variants of them:

a. Compute $$r_k = \frac{1}{N}\sum_{i=1}^{N} x_i x_{i+k},$$

for k=0:(N−1), where $x_i=0$ for i<1 or i>N. Note: the procedure is not dependent on the scaling/normalization of the autocorrelation sequence at this point.

b. Compute the Fourier transform sequence $X_k$ (using Discrete Fourier Transform (DFT) or not) of $x_k$, square the magnitude of the values of $X_k$ point-by-point to obtain the sequence of power spectral density $S_k$ of $x_k$, and then compute the inverse Fourier Transform (using IDFT or not) of $S_k$ to obtain the sequence $r_K$.

In step 430, based on the sequence $r_k$, the routine constructs the sequence $$p_k = \frac{r_k - r_{k/2}}{r_0 - r_{k/2}}.$$

For odd values of k the value of $r_{k/2}$ can be estimated using various techniques, starting from averaging based on adjacent $r_k$ samples to more elaborate interpolation techniques. Any of these techniques may be used in step 430, and all are to be considered within the scope of the invention.

Advancing to step 440, the routine computes the period $T_p$ as the time between the first $p_k$ sample (k=0), and the location of the maximum value of $p_k$ based upon the known $T_s$ spacing of the $p_k$ sequence samples. Interpolation or extrapolation might be used to either estimate the peak position more accurately or to predict it.

A brief, and perhaps more intuitive, explanation of the proposed invention is described with reference to FIGS. 1-3. The particular signal in this case is the voltage amplitude of an electrical signal that is characteristic to some serial communication standards. This signal was digitally sampled with a Tektronix TDS oscilloscope, manufactured by Tektronix, Inc., Beaverton, Oreg. The signal is an NRZ signal, encoding "1s" and "0s", with the significant condition being the voltage of the signal within a time interval equal to the clock period. The clock is embedded in the signal and there should be an integer number of clock periods between signal transitions.

Figure 1:
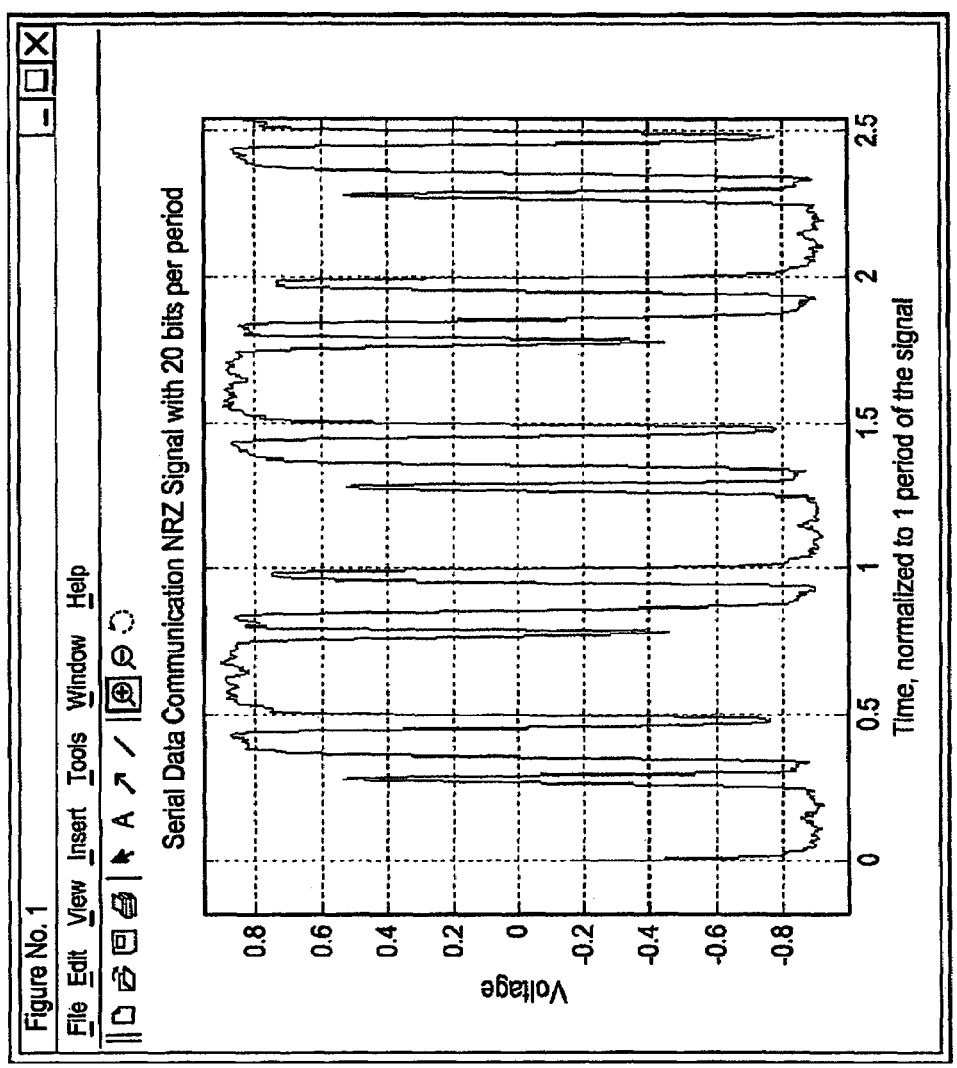
FIG. 1 is a screenshot of an oscilloscope useful for understanding the invention.

FIG. 1 is a screenshot of an oscilloscope showing a serial data communication periodic NRZ signal, 20 bits per period. FIG. 1 depicts some small portion of the periodic NRZ signal. It is obviously not easy to estimate the period of the signal even for this relatively simple case of 20 bits ("1s" and "0s").

Figure 2:
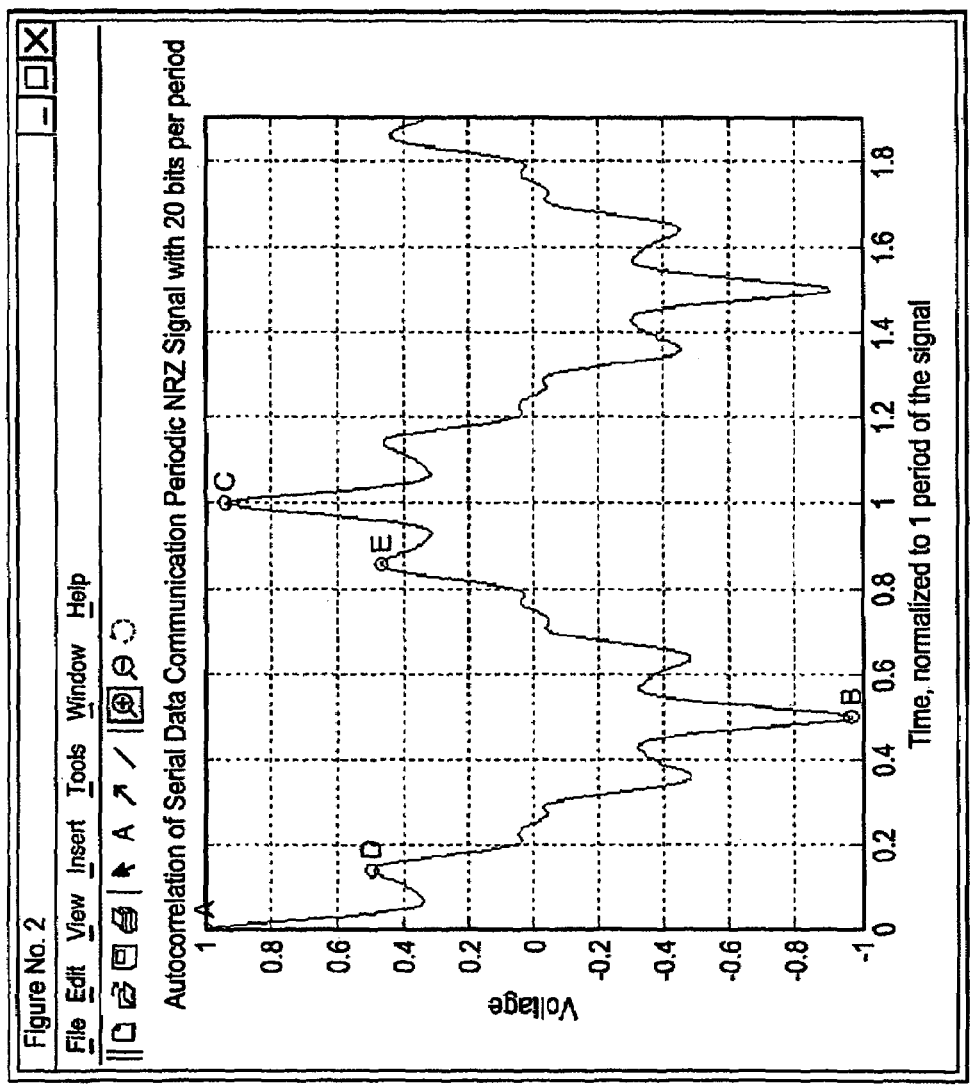
FIG. 2 is another screenshot of an oscilloscope useful for understanding the invention.

FIG. 2 is a screenshot of an oscilloscope showing autocorrelation of a serial data communication periodic NRZ signal, 20 bits per period. FIG. 2 depicts a portion of an autocorrelation of the signal of FIG. 1. Because the signal is finite-time (i.e., it has zero values outside some finite time window) the autocorrelation peaks at integer multiples of the signal period ($k*T_p$), with decreasing values as k increases (for k>0).

The subject invention recognizes that the first peak for k>0 in FIG. 2 is located at the point t* where $$f(t^*) = \frac{r(t^*) - r(t^*/2)}{r(0) - r(t^*/2)}$$

is maximum. In FIG. 2, we have $r(0)=r(t_A)$, $r(t^*/2)=r(t_B)$, $r(t^*)=r(t_C)$. This method eliminates false peaks like the ones labeled D and E in FIG. 2.

Figure 3:
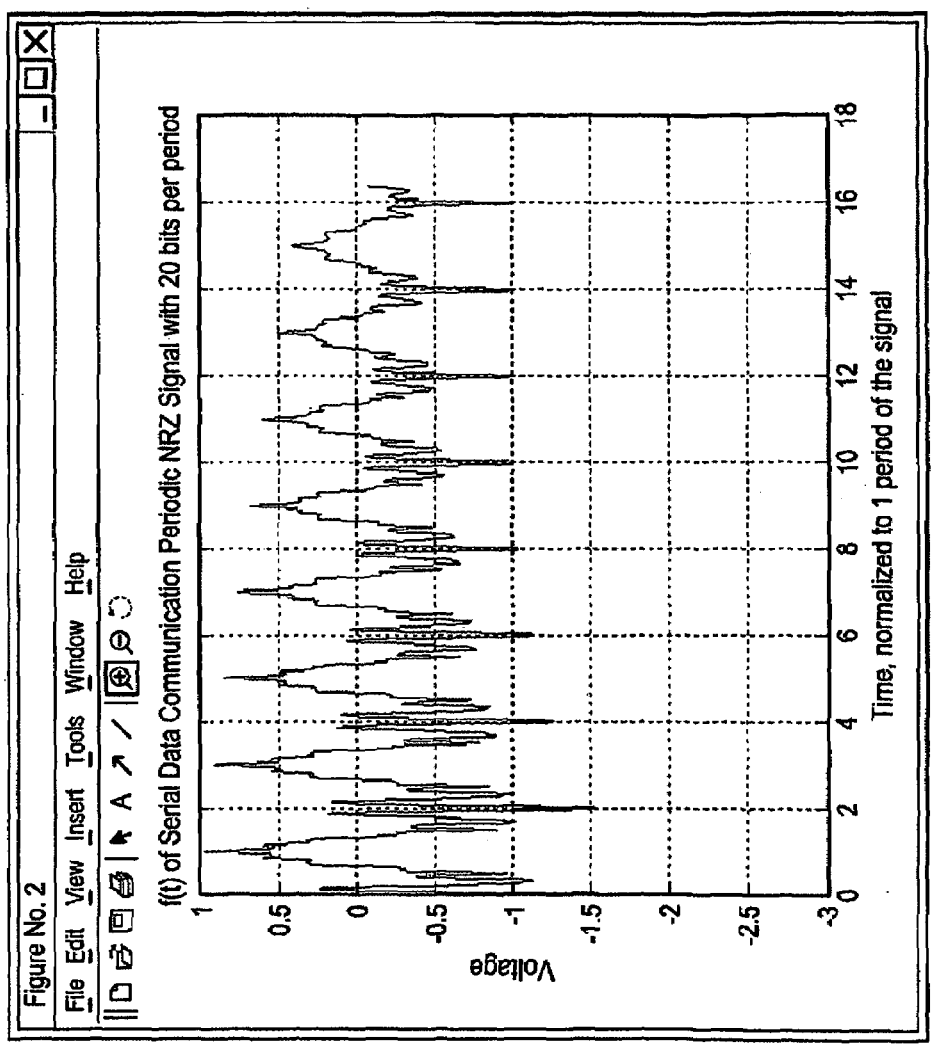
FIG. 3 is yet another screenshot of an oscilloscope useful for understanding the invention.

FIG. 3 is a screenshot of an oscilloscope showing a function dependent upon the autocorrelation of a serial data communication periodic NRZ signal, 20 bits per period, peaking at a time location equal to the signal period. Specifically, the function f(t), for the signal of FIG. 1, is depicted in FIG. 3. For this new function, which is dependent on the autocorrelation function, there exists a global maximum located exactly at the signal period.

It is important to note that the autocorrelation does not generally achieve the minimum, especially in practical cases, at $r(t^*/2)$. Thus, examining the signal for the first/global minimum location is not valid for estimating $T_p/2$. For example, for sequences generated with PRBS polynomials, that autocorrelation value is in the noise floor, and such an estimate of the time location is inaccurate.

Figure 5:
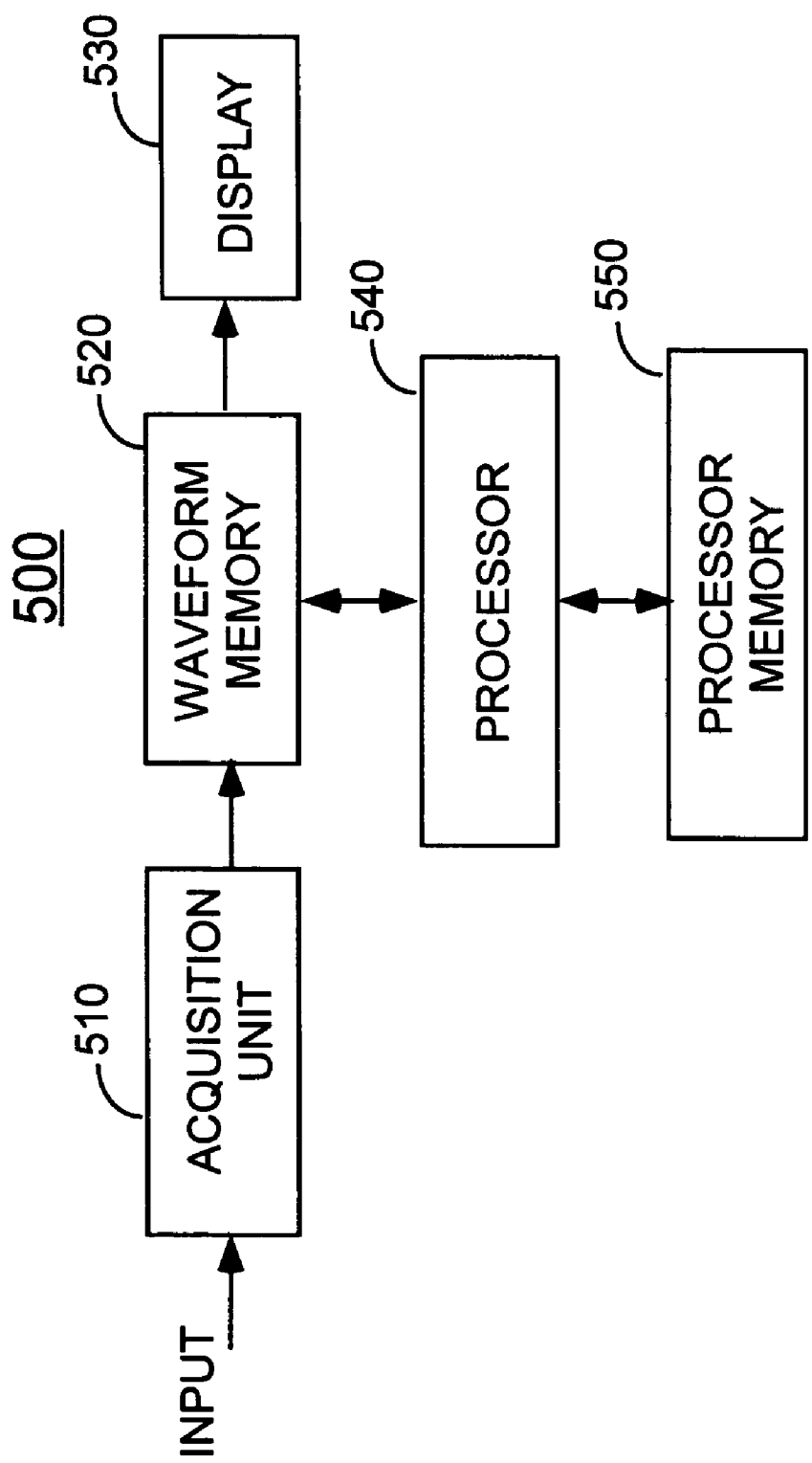
FIG. 5 shows, in simplified block diagram form, an oscilloscope suitable for use with the invention for performing the calculations of the flowchart of FIG. 4, and displaying the screenshots of FIGS. 1-3.

FIG. 5 shows in simplified block-diagram form, an oscilloscope 500 suitable for use with the subject invention. An acquisition unit 510 receives a signal under test (SUT) and digitizes (i.e., samples) the signal and stores the samples in a waveform memory 520. A processor 540 processes the waveform data samples and displays them on a display unit 530. Processor 540 has an associated memory 550 for storing program instructions, such as the instructions for performing the method herein described.

What has been described is a novel method for determining the period of a periodic non-return-to-zero (NRZ) signal. One skilled in the art will recognize that one advantageous use of the subject invention is in determining the period of an NRZ input signal as a first step in a clock recovery technique.

It is to be understood that the foregoing description has been presented by way of example only, and that the scope of the subject invention is limited only by the following claims.

The invention claimed is:

1. An oscilloscope having a program determining the period of a periodic non-return-to-zero signal, comprising:
   an acquisition circuit sampling said periodic no-return-to-zero signal at a predetermined sample rate having a predetermined sample interval;
   a waveform memory for storing said samples;
   a memory for storing said program;

a processor constructing an estimate of an autocorrelation sequence of said samples;

said processor constructing a sequence of peaks based upon said autocorrelation estimate;

said processor computing said period of said periodic non-return-to-zero signal as the interval between a time location of a first peak of said sequence of peaks and a time location of a peak having a maximum value with respect to other peaks based upon said predetermined sample interval; and a display screen; wherein at least one of said autocorrelation, said estimate, and said sequence of peaks is displayed on said display screen.

2. The oscilloscope of claim 1 wherein, said sequence of samples is $X(k)=X(T_k)$ where said predetermined sample interval is $T_s$, and $T_k=n*Ts$.

3. The oscilloscope of claim 2 wherein, said processor constructs said estimate by computing $$r_k = \frac{1}{N}\sum_{i=1}^{N} x_i x_{i+k},$$

for k=0:(N−1), where $x_i=0$ for i<0 or i>N.

4. The oscilloscope of claim 3 wherein, said processor constructs said sequence of peaks by constructing a sequence $$p_k = \frac{r_k - r_{k/2}}{r_0 - r_{k/2}},$$

wherein odd values of k the value of $r_{k/2}$ are estimated by averaging based on adjacent $r_K$ samples.

5. The oscilloscope of claim 4 wherein, said processor computes a period $T_p$ as a time between a first $p_k$ sample (k=0), and a time of a maximum value of $p_k$ based upon said $T_s$ spacing of said $p_k$ sequence samples.

6. The oscilloscope of claim 5 wherein, said processor constructs said sequence of peaks by constructing a sequence $$p_k = \frac{r_k - r_{k/2}}{r_0 - r_{k/2}},$$

wherein odd values of k the value of $r_{k/2}$ are estimated by averaging based on adjacent $r_k$ samples.

7. The oscilloscope of claim 6 wherein, said processor computes a period $T_p$ as a time between a first $P_k$ sample (k=0), and a time of a maximum value of $p_k$ based upon said $T_s$ spacing of said $p_k$ sequence samples.

8. The oscilloscope of claim 5 wherein, said processor constructs said sequence of peaks by constructing a sequence $$p_k = \frac{r_k - r_{k/2}}{r_0 - r_{k/2}},$$

wherein odd values of k the value of $r_{k/2}$ are estimated using interpolation.

9. The oscilloscope of claim 8 wherein, said processor computes a period $T_p$ as a time between a first $p_k$ sample (k=0), and a time of a maximum value of $p_k$ based upon said $T_s$ spacing of said $p_k$ sequence samples.

10. The oscilloscope of claim 2 wherein, said processor constructs said estimate includes by computing a Fourier transform sequence $X_k$ of $x_k$;

squaring magnitudes of values of $X_k$ point-by-point to obtain a sequence of power spectral density $S_k$ of $x_k$; and computing an inverse Fourier Transform of $S_k$ to obtain a sequence $r_K$.

11. The oscilloscope of claim 3 wherein, said processor constructs said sequence of peaks by constructing a sequence $$p_k = \frac{r_k - r_{k/2}}{r_0 - r_{k/2}},$$

wherein odd values of k the value of $r_{k/2}$ are estimated using interpolation.

12. The oscilloscope of claim 11 wherein, said processor computes a period $T_p$ as a time between a first $p_k$ sample (k=0), and a time of a maximum value of $p_k$ based upon said $T_s$ spacing of said $p_k$ sequence samples.

* * * * *